United States Patent [19]

Kubat et al.

[11] Patent Number: 4,797,135

[45] Date of Patent: Jan. 10, 1989

[54] METHOD OF FACILITATING COMMINUTION OF WOOD AND OTHER TYPES OF VEGETABLE BIOMASS FOR USE AS FUEL

[76] Inventors: Josef Kubat, Solparksvägen 3, S-171 35 Solna; Lars M. Qvist, Hästhagsvägen 6, S-448 00 Floda, both of Sweden

[21] Appl. No.: 132,952

[22] PCT Filed: Feb. 13, 1987

[86] PCT No.: PCT/SE87/00071

§ 371 Date: Dec. 4, 1987

§ 102(e) Date: Dec. 4, 1987

[87] PCT Pub. No.: WO87/05044

PCT Pub. Date: Aug. 27, 1987

[30] Foreign Application Priority Data

Feb. 14, 1986 [SE] Sweden ............................ 8600669-9

[51] Int. Cl.$^4$ ............................ C10L 5/44; C10L 5/40
[52] U.S. Cl. ........................................ 44/500; 44/589; 44/605; 241/28
[58] Field of Search .................... 241/28; 44/500, 605, 44/589

[56] References Cited

U.S. PATENT DOCUMENTS

| | | | |
|---|---|---|---|
| 1,668,660 | 5/1928 | Shimamoto | 44/16 C |
| 2,565,420 | 8/1951 | Ayers | 241/28 |
| 4,187,141 | 2/1980 | Ahrel | 241/28 |
| 4,247,363 | 1/1981 | Soma et al. | 241/28 |

FOREIGN PATENT DOCUMENTS

| | | |
|---|---|---|
| 899493 | 12/1953 | Fed. Rep. of Germany . |
| 3332913 | 12/1984 | Fed. Rep. of Germany . |
| 2037804 | 12/1970 | France . |
| 2487374 | 7/1980 | France . |
| 57-179295 | 4/1981 | Japan . |
| 8400976 | 3/1984 | PCT Int'l Appl. . |
| 123267 | 11/1948 | Sweden . |
| 638653 | 6/1950 | United Kingdom . |

*Primary Examiner*—Carl F. Dees
*Attorney, Agent, or Firm*—Browdy & Neimark

[57] ABSTRACT

A method for the production of highly comminuted flour of wood and other types of vegetable biomass suitable for the use as fuel, in that coarsely ground wood or other type of coarsely ground vegetable biomass is treated with a dilute solution of an alkaline substance, and subsequently exposed to elevated temperatures, whereafter the treated coarsely ground material is subjected to grinding, whereby a finely divided powder with a narrow particle size distribution is obtained.

6 Claims, No Drawings

METHOD OF FACILITATING COMMINUTION OF WOOD AND OTHER TYPES OF VEGETABLE BIOMASS FOR USE AS FUEL

FIELD OF THE INVENTION

A method of facilitating comminution of wood and other types of vegetable biomass for use as fuel.

BACKGROUND OF THE INVENTION

During recent years, alternative fuels have attracted considerable interest. This is particularly true of fuels based on renewable sources as, for instance, wood, straw, and other types of biomass, including also a variety of wood- and biomass waste. Also peat, even though not renewable, may be mentioned in this connection.

The use of such materials for fuel purposes can often be facilitated if they are available in particulate form. A typical example is wood flour used as replacement for oil in boilers etc. The average particle size of such material will, as a rule, depend on the type of the use it is intended for. In general, a far going reduction of the particle size is desirable. When burning particulate fuels in boilers one thus finds that smaller particles give a shorter flame which is easier to control. The importance of a sufficiently small particle size becomes especially obvious when using particulate fuels in gas turbines or diesel engines. In the first case, the burning process must be completed during the short passage of the particle through the turbine, whereas in the latter case the fuel cannot behave in the intended manner if the particle size has not been reduced sufficiently before the injection in the combustion chamber of the diesel engine.

It is known that grinding of biomass of various provenience to fuels with sufficiently small particle size—one could mention as an example an average size of 10 $\mu$m—is a highly energy consuming process. It is also known that a chemical pretreatment of the biomass intended for fuel purposes has been proposed in order to facilitate the size reduction. In the first place, a pretreatment using acidic substances has been proposed, preferably various acids normally used as dilute water solutions. Such a treatment breaks the glycosidic linkages of the cellulose, thus reducing the length of the molecular chains. This, in turn, brings about a marked embrittlement of the material treated in such manner. Effects of this type can be observed both with pure cellulose and with various types of lignocellulosic materials, as wood, unbleached cellulose fibre etc. Examples of embodiments of such embrittlement can, for instance, be found in the U.S. Pat. No. 3,961,913 which describes the treatment of the organic fraction of municipal solid waste with acid solutions at elevated temperatures, in order to convert this fraction to powder. Another example is the embrittlement of wood chips using dilute sulphuric acid in order to make possible the comminution of the wood substance into fine particles before it is converted in a reactor into a liquid fuel (Schalegger, L.L. et al.: Sol. Energy Syst. Inst., Tech. Rep. 1979, TP-33-285, 3rd Ann. Biomass Energy Syst. Conf., 1979, Proc., 119–22). One can here also mention the steaming of wood at temperatures in excess of 150° C. as described in the Swedish Pat. No. 84851. During such treatment a number or organic acids are liberated through chemical reactions, which, in turn, results in the embrittlement discussed here.

SUMMARY OF THE INVENTION

The present invention relates to a method to produce a highly comminuted powder from wood and other types of vegetable biomass, suitable for the use as fuel. This method can be used both for pure cellulose and for various types of lignocellulosic materials, including wood, unbleached cellulose fibre, straw etc. It has in connection with the present invention been demonstrated that by treating coarsely ground wood and other types of coarsely ground vegetable biomass with dilute solutions of alkaline substances, such as sodium or potassium hydroxide, the coarsely ground flour of wood or other vegetable biomass being treated by said solution and exposed to elevated temperatures, one obtains an embrittled, easily ground material which can be comminuted at low energy consumption to a finely divided powder with a narrow particle size distribution, excellently suited as fuel for steam boilers, gas turbines, diesel engines etc. The narrow particle size distribution renders this material highly suitable as fuel in boilers since it produces a short, easily controlled flame. Another advantage of resulting powder is that it reduces corrosion and toxic emissions compared with the use of wood material which has been treated with acidic substances, for example sulphuric acid, to achieve the embrittlement. Still another advantage is the fact that the powder obtained according to the present invention on combustion yields alkaline ashes which can be used as fertilizer, for instance in treating acidic soil.

DETAILED DESCRIPTION OF THE INVENTION

As examples of the effects which can be obtained by the degradation of wood by water solutions of sodium hydroxide, results relating to the embrittlement of coarsely ground poplar flour with an average particle size of 200–300 $\mu$m will be illustrated. The largest particles were 3–5 mm. The particle size obtained after 1 minute of grinding in a laboratory ball mill is used as a measure of the degree of embrittlement. The sample (0.1 g) was placed in this ball mill (Retsch Mixer Mill) in a cylindrical cavity with the dimensions 45×12 mm (length×diameter). The milling was performed using two steel balls with a diameter of 10 mm. The vibration frequency of the mill was 1500 per minute.

Untreated poplar wood flour gave after milling in the above device for 1 minute a reduction of the particle size such that numberwise the main part of the particles fell within the range 50–75 $\mu$m; furthermore, a relatively large number of small particles could be seen, and, above all, also large particles measuring 0.5–1 mm.

Experiments were then performed by treating the coarsely ground poplar wood flour with sodium hydroxide. In these experiments, the coarsely ground poplar wood flour was impregnated at room temperature with dilute solutions of NaOH so that the absorbed liquid amounted to twice the weight of the dry starting material.

The impregnated coarse flour was placed in an oven at a temperature of 180° C. for 1 and 2 h. The absorbed liquid evaporated during this treatment apart from the NaOH content of the impregnating solution which remained in the flour. After this treatment the dry flour was ground in the above described mill for 30 and 60 s. The results were as follows.

TABLE 1

Embrittlement of coarse poplar flour by impregnation with dilute solutions of sodium hydroxide, and drying at elevated temperature.

| NaOH-concentration, % | Temp., °C. | Time, h | Milling time, s | Average particle size μm |
|---|---|---|---|---|
| 2.5 | 180 | 1 | 30 | 1–3 |
| 2.5 | 180 | 1 | 60 | 1–3 |
| 1.0 | 180 | 1 | 30 | 20–30 |
| 1.0 | 180 | 1 | 60 | 5–10 |

These results indicate in a highly tangible way the marked effect of the impregnation of the coarse flour with the NaOH solution on the grindability. An especially important finding is the fact that the figures of the table giving the particle size relate to very narrow particle size distributions. This is a significant improvement compared to the flour obtained in grinding of the untreated coarse material, where numerous large particles contributed to a broadening of the size distribution. By the treatment with the NaOH solutions as described above the larger particles were entirely eliminated from the ground product. As already mentioned, particles with sizes amounting to 0.5–1 mm were observed also in the untreated coarse material subjected to grinding in the ball mill for 1 min.

As a supplement to these results, a series of experiments was also carried out wth impregnating moist (ca. 70% water content) wood flour. These experiments gave the following results.

TABLE 2

Embrittlement of coarse poplar wood flour by impregnation with dilute solutions of sodium hydroxide and subsequent drying at elevated temperature. Impregnation of moist wood flour (70% water content).

| NaOH-concentration, % | Temp., °C. | Time, h | Milling time, s | Particle size, μm |
|---|---|---|---|---|
| 2.5 | 180 | 1 | 30 | 10–15 |
| 2.5 | 180 | 1 | 60 | 3–5 |
| 2.5 | 180 | 2 | 60 | 3–4 |
| 1.0 | 180 | 1 | 30 | 20–30 |
| 1.0 | 180 | 1 | 60 | 5–10 |
| 1.0 | 200 | 1 | 30 | 15–25 |
| 1.0 | 200 | 1 | 60 | 5–15 |
| 1.0 | 180 | 2 | 60 | 5 |
| 0.5 | 200 | 1 | 60 | 10–15 |
| 0.1 | 200 | 1 | 60 | 15–20 |

Also in these experiments the observed particle size distributions were very narrow, with average values being approximately given by the figures in Table 2. For the sake of completeness, it may be mentioned that a smaller number of large particles were observed in the two last experiments given in Table 2. The embrittling action of sodium hydroxide is, however, highly significant also in these cases.

From the above series of experiments it is clearly evident that impregnation of wood flour with dilute solutions of sodium hydroxide, followed by heat treatment at elevated temperatures, has a markedly embrittling effect on the wood particles. Considering the substantial energy consumption in grinding of untreated wood substance, this certainly offers an interesting possibility to improve the grinding process. Not only the energy consumption in grinding the embrittled material is lower, but also the capital cost in planning a grinding installation will be lower since the capacity of the equipment increases. To this comes the advantage of not having to deal with large particles, which eliminates the need of a sieving operation in connection with the grinding process.

The embrittling effect of sodium hydroxide, as demonstrated above, is not limited to the method described here, that is to say impregnation of the wood substance with a NaOH solution, and subsequent treatment at elevated temperatures. That method has been chosen to illustrate the effect in question with its easiness of adaptation to industrial conditions in mind, as for instance in a wood flour plant for the production of finely divided biomass fuel. It has thus been found that equivalent results can be achieved by carrying out the treatment in suspension, where the wood flour is dispersed in the NaOH solution. This suspension is then subjected to elevated temperatures, which at temperatures exceeding the boiling point of the solution implies that the treatment has to be carried out under pressure.

Also the impregnation method can be modified if necessary. Spray application of the NaOH solution of the desired concentration can thus be a suitable way to exploit the present invention. The concentration of the sodium hydroxide in the solution is then adjusted so that the amount of hydroxide taken up by the wood substance during the spray treatment produces the desired degree of embrittlement. The advantage of this form of implementation of the present invention is, among other things, that the quantities of solution to be handled in carrying out the embrittling treatment are significantly reduced.

The basic idea behind this invention is naturally not limited to the use of sodium hydroxide as the active substance in this context. Other alkaline substances suitable for the embrittlement of wood are, for instance, potassium hydroxide and certain organic bases, such as amines or bases related to quaternary ammonium salts.

We claim:

1. A method for the production of highly comminuted flour of wood and other types of vegetable biomass suitable for use as fuel characterized in that coarsely ground wood or other type of coarsely ground vegetable biomass is treated with a dilute aqueous solution of an alkaline substance and subsequently is dried by exposure to elevated temperatures, whereafter the treated coarsely ground material is subjected to grinding, whereby a finely divided powder with a narrow particle size distribution is obtained.

2. A method according to claim 1 characterized in that the alkaline substance is sodium hydroxide.

3. A method according to claim 1 characterized in that the alkaline substance is potassium hydroxide.

4. A method according to claim 1 characterized in that the treatment of the coarsely ground material with the dilute aqueous solution of the alkaline substance is accomplished by impregnation or absorption.

5. A method according to claim 1 characterized in that the treatment with the alkaline substance takes place in suspension the coarsely ground material being suspended in the dilute solution of the alkaline substance.

6. A method according to claim 1 characterized in that a moist coarsely ground material is subjected to the treatment with the alkaline substance.

* * * * *